Figure 1:
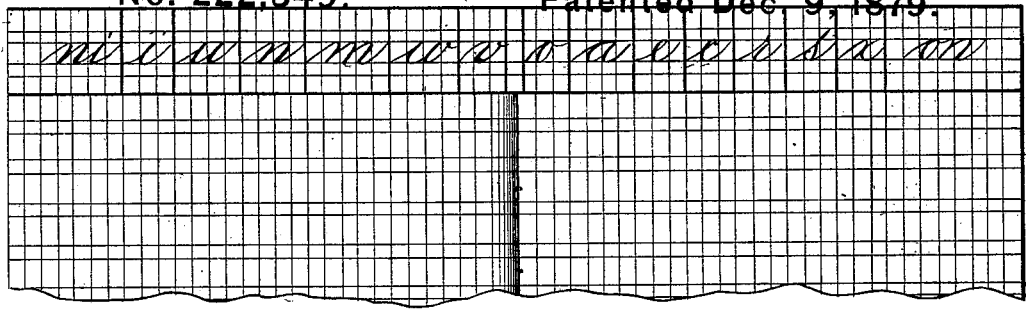
Figure 2:
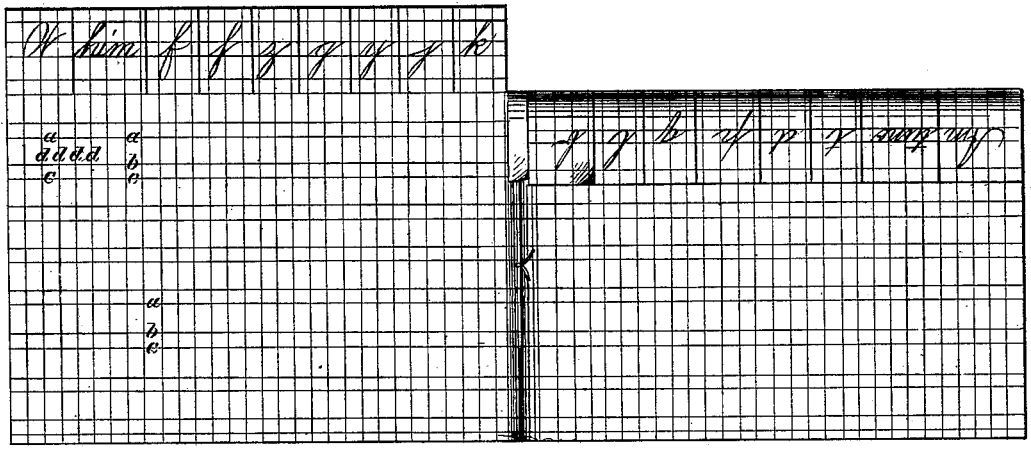

2 Sheets—Sheet 1.

J. W. C. GILMAN.
Copy-Book.

No. 222,349. Patented Dec. 9, 1879.

WITNESSES.
F. F. Raymond 2d
George F. Walker

INVENTOR.
J. W. C. Gilman

J. W. C. GILMAN.
Copy-Book.

No. 222,349.  Patented Dec. 9, 1879.

UNITED STATES PATENT OFFICE.

JONATHAN W. C. GILMAN, OF MALDEN, MASSACHUSETTS.

IMPROVEMENT IN COPY-BOOKS.

Specification forming part of Letters Patent No. 222,349, dated December 9, 1879; application filed August 17, 1878.

*To all whom it may concern:*

Be it known that I, JONATHAN W. C. GILMAN, of Malden, Middlesex county, Massachusetts, have invented an Improvement in Children's Copy-Books, for the instruction of pupils of tender years in the art of writing, of which the following is a specification.

It is considered desirable that they should be considerably assisted in their instruction, so that correct habits in the formation of letters may be formed in the child as to distances, heights, slopes, connections, and the like. It is also desirable to make the books of practice for young children cheap and easy, and to avoid confusion in their minds about the copies to be practiced. In other words, in teaching the complicated art of writing it is desirable that the child should have as few new things to learn at one time as possible, and that he should be assisted in learning those things as much as possible by the writing-book in which his practice is to be made. It is also considered desirable that the instruction and practice should be made with pencil and paper, or with ink and paper, rather than upon a slate: first, because the slate is a much noisier implement than pencil or pen and paper; second, because it is an imperfect medium to write on, because its color is exactly the opposite of the color of the writing medium used in every-day life; and, third, because proper assistance in the way of determined points for the pupil to carry his lines toward cannot be furnished upon the slate except at a great expense and by actual injury to the writing-surface. Slates are ruled by incision, and the point of the pencil in writing catches in the depressions, and not only makes a disagreeable noise, but, actually, they interfere with the writing practice. It is therefore, as I have said, considered desirable that the writing practice of small children should be on paper.

I have invented a new writing-book which embodies many desirable features. The points and angles and turns of letters are all determinable upon this book by the angles of the rulings, and the ruling is not complicated by the use of sloped lines. The copies are so arranged that only one of them is exposed at a time for practice, and that may be a single letter.

The methods of ruling this book are as follows: It is ruled horizontally with pairs of parallel lines, which are placed twice as far apart as the distance between the pairs of lines first spoken of. This divides the pages horizontally into alternate subdivisions proportioned to each other, as 1 : 2 : : 1 : 2. The page is further ruled perpendicularly by lines placed at such distances from each other that the downstrokes or sloped lines of the writing shall be diagonals of a parallelogram made by the two horizontal lines which are farthest apart, and by two of the perpendicular lines.

In the drawings the slope determined upon is about fifty-two degrees, measured from the horizontal, and the larger rectangles are consequently higher than they are wide. In writing of this character single-space lower-case letters, like u, will occupy, written singly, four of the large rectangles horizontally. The upstroke begins at the lower left-hand corner of one of the rectangles, and extends to the upper right-hand corner of the second rectangle. The first downstroke extends from the upper right corner of the second rectangle to the lower left corner of the same rectangle. The second upstroke extends from the lower left corner of the second rectangle to the upper right corner of the third rectangle, and the second downstroke from the upper right corner of the third rectangle to the lower left corner of the third rectangle, and the third upstroke from the lower left corner of the third rectangle to the upper right corner of the fourth rectangle.

The letters u and n, and, with a slight modification in the last upstroke, w, would fall into this category. The i would be made so as to occupy only three rectangles horizontally; the m so as to occupy five; i e c r s x, and, with a slight modification, v, occupy three rectangles horizontally.

In order to apply this method of instruction in the making of stem and loop letters we assume that the stem letters t, d, and p will be of twice the height of the small letters; that the loop letters l, b, h, and k and long s will be of three times the height of the small letters; that the stem letters q and p will extend below the base of the line once and a half time the height of the small letters, or of the height of the head of the q.

We also assume that the loop letters below the line j, y, g, f, and long s will extend below the line twice the height of the small letters. These are the ordinary proportions for what is called "medium hand."

It will be observed that we have thus far taught the pupil to write within the spaces of the largest vertical dimensions.

We employ for teachers the stem and loop letters, the spaces presenting the smaller vertical dimensions—that is, the stem and loop letters are written between the narrow pairs of horizontal lines. Taking p as an illustration of the stem letters, we begin in the lower left corner made by the crossing of one of the perpendicular lines with the lower one of the nearer pair of horizontal lines, and make the upstroke so as to go through the head-line a little to the left of the upper right angle and terminate in the center of the larger rectangle immediately to the right of the rectangle in which we begin, and from this point the downstroke is drawn through the upper right corner of the rectangle which we started in straight to the perpendicular line upon which we started and in the line of the diagonal of the larger rectangle. The second upstroke is then made so as to strike in the center of the second small rectangle. The second downstroke is made to the lower left corner of the second smaller rectangle, and the third upstroke to the upper right corner of the second smaller rectangle. The p thus occupies horizontally two of the smaller rectangles. The d does the same, also the h, k, b, and q, and t occupies one and a half of the smaller rectangles; but l occupies horizontally a space equal to two of the smaller rectangles, from the fact that it is extended upward into the upper right corner of the second larger rectangle, which point is also the point reached by the upper turn of all the loop letters above the line.

The loop letters below the line have their lower turn at the lower left corner of the first large rectangle below the base-line.

I propose that combinations of letters should be taught in medium hand principally, although it is possible, and perhaps desirable, to practice a few combinations in the larger rectangles, in which all the angles and turns of letters are determined by the angles of the ruling, while in the medium hand only half as many angles of the ruling are employed, and these serve principally for determining the points to be attained by the angles and turns of the new character, those which the pupil is supposed to have learned in his practice in the larger rectangles.

Thus it will be seen that the pupil in the new matter taught him has as much assistance in giving direction to his lines as in the new matter that was originally taught him, while in the matter in which he is supposed to have become somewhat proficient he has only half as much assistance; and this is true with regard to combinations as well as with regard to practice upon simple letters.

In the use of this ruling for instruction in the formation of capitals it is again supposed that the pupil has made some advance, and has had his eye educated in judging of distances and directions, to some extent, without having the track of the lines of the letters exactly pointed out to him by the angles of the ruling. Take, for instance, the letter Y, which occupies a space vertically equivalent to two of the larger and one of the smaller rectangles. The upstroke begins near the lower left corner of a small rectangle, and is carried up with a proper curve to about the center of the head-line of the second large rectangle, and there turning, the first downstroke is made substantially along the diagonal of the second large rectangle, and turns into the second upstroke near the center of the first small rectangle. The second upstroke passes through the center of the head-line of the second small rectangle, and strikes a vertical line at the center of the line bounding on the right the second large rectangle. The second downstroke is then drawn parallel to the diagonal of the large rectangle, and so as to pass through the lower left corner of the second small rectangle and land with a turn in the lower left corner of the first large rectangle below the base-line, from which the third upstroke is drawn through the lower left corner of the second small rectangle, and lands in the upper right corner of the second small rectangle.

Thus it will be seen that nine points are determined by the ruling for this letter, five of which are angles in the ruling, and the others of which are half-distances between angles.

Similarly the letter M, which occupies a large and small rectangle vertically and three rectangles horizontally, has a variety of points determined by the angles of the ruling, and several other points by different distances from the angles. For instance, it begins with the stem-line or first stroke in the center of the head-line of the third large rectangle, and its first stroke is made on a line nearly parallel to the diagonal of the large rectangles, so as to approach, but by its curve to slightly turn away from, the lower right corner of the first small rectangle, and to touch the base-line of the lower left small rectangle at the center, from which it curves upward, so as to approach, but not quite touch, the upper left corner of the first small rectangle, and crosses the center of the right boundary of the two first rectangles.

The second stroke of the M begins at the point of beginning and is drawn downward to the center of the base-line of the second small rectangle, passing near but not through the upper right corner of the second small rectangle. The next line is drawn nearly through the upper right corner of the second rectangle, and strikes the upper right corner of the third large rectangle, from which it is drawn downward to the lower left corner of the third small rectangle, and then turns and lands finally in the upper right corner of the third small rectangle.

These two letters have been selected as illustrations; but if all the capitals be written according to harmonious proportions this ruling will be found to give some definite points of starting and turning, which will assist the pupil in forming the habit of writing with harmonious proportion, because the ratio of one to two vertically and such other ratio horizontally as is determined by the slope of the letters agreed upon in advance, always furnish by the angles of the lines such definite points for certain parts, even of capitals, as assist the pupil in making them of harmonic proportions.

Heretofore in the arrangement of copies for a copy-book they have either been printed upon two separate sheets which have been attached to the covers and turned out, the copies for the right side being on the back cover, the copies for the left side upon the front cover, so as to expose all the copies for practice on the left-hand pages, or on the right-hand pages, respectively, at the same time, or they have been printed or prepared upon slips which have been held in front of the pupil loosely, or the copies have been printed at the head of each page, or occasionally on the left-hand margin.

Where the copies are printed upon pages there is considerable expense incurred. Where they are printed upon detached slips the slips are liable to be lost or destroyed; and where they are exposed in a body before the pupil, or the copies of the left-hand page or of the right-hand page, respectively, at the same time, the quantity of matter which is not to be imitated is always much greater than the quantity of matter which is to be imitated, and creates confusion.

The method which I propose is particularly applicable to an elementary book. It consists in an arrangement by which only the copy for immediate use, letter or word, as the case may be, is exposed at any given time, and it may be carried into practice in either one of several ways. These copies may be printed upon one or more continuous strips, which may be fastened to the top of the cover of one of the pages, so as to unfold and expose the copy to be practiced upon. Between each two of the copies the paper is slit down to the edge of the sheets of the copy-book. From this it results that only one copy may be turned up at a time and exposed to view, while the others are turned down and concealed.

Another method consists in printing these copies upon strips of paper, and separating them by perforation or otherwise, and then gumming a portion at the lower edge, whereby each copy may be detached from all the others and cemented upon its appropriate page.

A third method consists in printing these copies upon stiff paper, and providing each one with two parallel slits near the center of its lower margin, whereby a tongue is formed in the center of the slit, which can be placed on one side of the paper edge, while the other two wings on the outside of the slit are placed on the other side of the paper edge. These three methods embody the ways which I have contemplated for exposing the copy to the view of the pupil.

In the drawings, *a b* represent the horizontal lines which serve as a boundary to the larger rectangles, and *b c* the horizontal lines which serve as the upper and lower boundaries of the smaller rectangles. *d d* are the vertical lines, to which I have already alluded.

The slip to be used in connection is represented at E. In this *f g* are parallel vertical slits, which are pasted upon the edge of the paper of the writing-book, and stick to it sufficiently close to retain the copy in place.

This copy is ruled with lines to correspond with the ruling of the book, and in use the slits should be cut and the copy put in position upon the edge of the sheet, so as to manifest clearly to the pupil the proper adjustment of the letters to the ruling.

Figure 3:
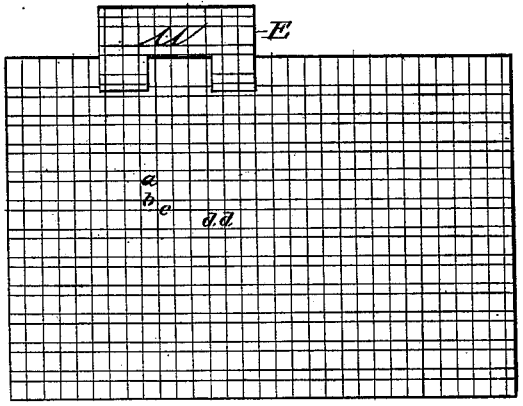
Figure 4:
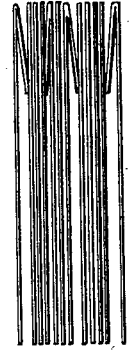
Figure 5:
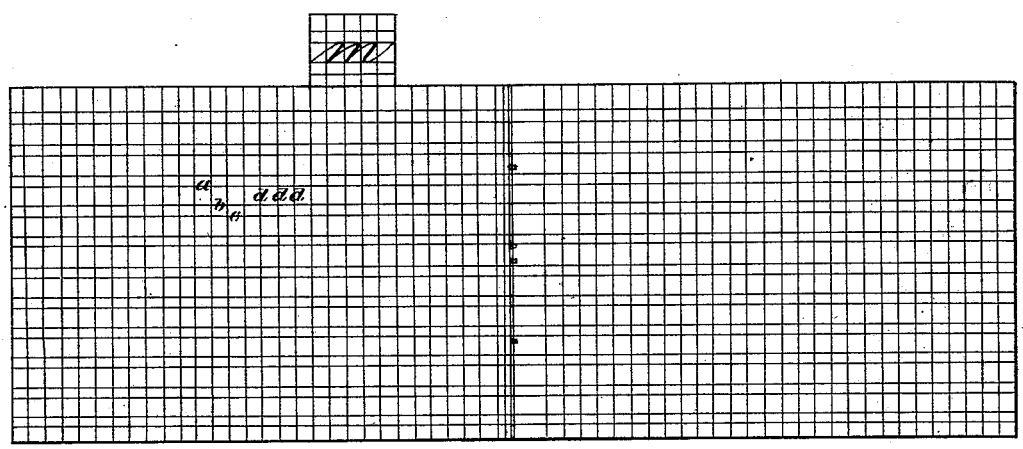
Figure 6:
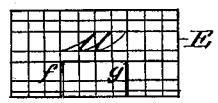

The drawings represent at Fig. 3 one of these slips, in which the two parallel slits are lettered *f* and *g*.

I propose to prepare these books upon strong well-finished Manila or other cheap paper, so as not to be costly, and this paper is sufficiently good for all use in the early teaching of young children.

I also propose to put up a paper of this ruling without being bound into books, cut of convenient size for such use as may seem appropriate to teachers.

I claim as my invention and desire to secure by Letters Patent—

1. A copy book or sheet ruled with pairs of horizontal lines, so that the vertical distances between the lines upon the page are in the ratio of one to two, and uniformly ruled vertically by lines at the distances apart of the width of a lower-case one-space letter written in the taller horizontal space, substantially as and for the purpose described.

2. A copy book or sheet ruled horizontally into spaces bearing the ratio to each other of one to two, and crossed vertically by a uniform ruling of one-half the width of the extension of a single-loop letter written on the base-line of the narrower horizontal ruling, substantially as and for the purpose described.

3. A copy-book slip or copy-card arranged to be firmly affixed to the edge of the book or practice-sheet, but projecting above it, each slip or card containing but a single exercise, and presenting upon its face around the letter or word to be practiced upon a ruling corresponding to the ruling upon the page to be practiced upon, substantially as and for the purpose described.

4. A copy-book leaf or sheet provided with an exercise-slip or copy-card, arranged to be firmly affixed to the edge of the leaf or sheet and to project above it in the manner indicated, substantially as for the purposes described.

JONATHAN W. C. GILMAN.

Witnesses:
F. F. RAYMOND, 2d,
GEO. F. WALKER.